May 17, 1966 W. MESSERSCHMITT 3,251,567

MOUNTING OF DUAL CYCLE PROPULSION UNITS IN THE TAIL OF AN AIRCRAFT

Filed March 25, 1963

INVENTOR.
Willy Messerschmitt

BY

Michael S. Striker
Atty 3,251,567
Patented May 17, 1966

3,251,567

MOUNTING OF DUAL CYCLE PROPULSION UNITS IN THE TAIL OF AN AIRCRAFT

Willy Messerschmitt, Munich, Germany, assignor to Messerschmitt AG, Augsburg, Germany, a corporation of Germany Filed Mar. 25, 1963, Ser. No. 267,418
5 Claims. (Cl. 244—74)

This invention concerns the mounting of dual cycle jet propulsion units in the tail of an aircraft and in particular relates to an important modification of the means for exhausting the boundary layer air from the contour of the fuselage.

The mounting of propulsion units in the tail of an aircraft fuselage has the advantage that since no units are mounted in the wings, the wing surface may have a completely smooth contour and the noise level in the aircraft is considerably decreased.

In known mountings of propulsion units of this kind a small channel generally runs to the end of the fuselage between the wall of the fuselage and the propulsion unit in order that the air from the boundary layer does not enter the intake of the propulsion unit but is led away with little or no effect.

The subject matter of the invention improves the efficiency of this kind of mounting in that a first duct of the propulsion unit or units takes in the air near the boundary layer whilst a second duct takes in air drawn from the boundary layer, which air may be passed to an after burner to increase the thrust of the unit.

The invention will be further apparent from the following description, with reference to the accompanying drawings which show, in diagrammatic form, by way of example only, an embodiment of the invention.

Figure 1:
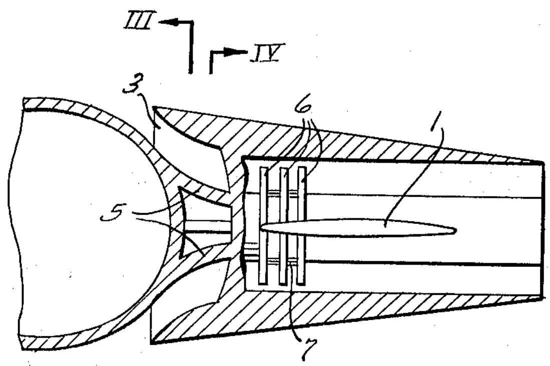
FIG. 1 is a vertical section through a multiple propulsion plant according to my present invention, taken along line I—I of FIG. 2.
Figure 2:
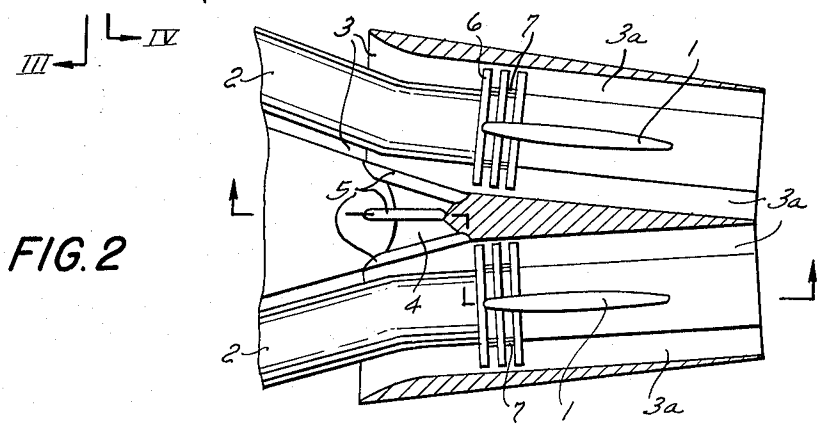
FIG. 2 is a horizontal section through the multiple propulsion plant shown in FIG. 1.

Referring now to the drawings, wherein like reference numerals indicate like parts, it will be seen that a multiple arrangement of propulsion units comprises two individual units 1. An inlet 2 feeds air in the known way to the first main duct. A channel 3 feeds air from the boundary layer to the outer bypass ducts generally indicated by the reference numeral 3*a* of the units 1. Conveniently the channels 3 for the air from the boundary layer are annular and their inlets surround the tail of the fuselage.

A mixing chamber 4 is provided in front of the bypass ducts 3*a* of the multiple propulsion plant, which chamber 4 serves to blend the air from the boundary layer whose particles have various air speeds and feed such air to the ducts 3*a* after its turbulence has been reduced in accordance with flow technique. Guide vanes 5 are provided in the mixing chamber 4 and serve to guide the air current.

The forward compressor blades 6 for the first and second ducts 3 and 3*a* of any unit 1 are separated, by a ring 7 mounted in the direction of air flow, in such a way that air cannot pass from the inner first duct 3 into the outer second duct 3*a*. The angles of the blades 6 are adjusted to different angles in accordance with different air speeds in ducts 3 and 3*a*.

Figure 3:
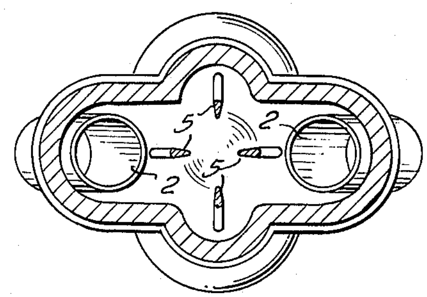
FIG. 3 is one cross section through the multiple propulsion plant shown in FIGS. 1 and 2 taken along line III—III of FIG. 1.
Figure 4:
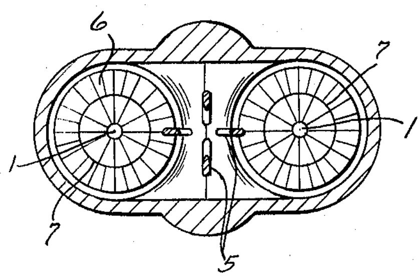
FIG. 4 is another cross section through the multiple propulsion plant shown in FIGS. 1 and 2 along line IV—IV of FIG. 1.

FIGS. 3 and 4 are sections taken on the lines III—III and IV—IV of FIG. 1 and are self-explanatory.

The propulsion plant may be arranged so that after burners 8 are provided, in the normal manner, in the rear portions of both ducts 3 and 3*a*, or in the first duct 3 only, or in the second duct 3*a* only.

What I claim is:

1. In an aircraft, in combination, a fuselage having a tail portion; two jet propulsion units mounted in said tail portion adjacent each other, each jet propulsion unit including an inner main duct means having an inlet for air spaced from the surface of said fuselage and located close to, but outside of the boundary layer of air on the same, annular bypass duct means surrounding said inner main duct means and having an inlet on the surface of said fuselage for the boundary layer of said surrounding the same, and jet engine means located in said inner main duct means; and mixing chamber means located in said fuselage between said annular bypass duct means of said two units and connecting said bypass duct means upstream of said jet engine means so that air of the boundary layer entering through said inlets of the respective bypass duct means of said two units is mixed before flowing to said jet engine means.

2. In an aircraft, in combination, a fuselage having a tail portion; two jet propulsion units mounted in said tail portion adjacent each other, each jet propulsion unit including an inner main duct means having an inlet for air spaced from the surface of said fuselage and located close to, but outside of the boundary layer of air on the same, annular bypass duct means surrounding said inner main duct means and having an inlet on the surface of said fuselage for the boundary layer of air surrounding the same, and jet engine means located in said inner main duct means; mixing chamber means located in said fuselage between said annular bypass duct means of said two units and connecting said bypass duct means upstream of said jet engine means so that air of the boundary layer entering through said inlets of the respective bypass duct means of said two units and having different air speeds is mixed before flowing to said jet engine means, and guide vanes in said mixing chamber for reducing the turbulence of said air being mixed therein and for guiding the mixed air to said jet engine means.

3. In an aircraft, in combination, a fuselage having a tail portion; two jet propulsion units mounted in said tail portion, each jet propulsion unit including an inner main duct means having an inlet for air spaced from the surface of said fuselage and located close to, but outside of the boundary layer of air on the same, and annular bypass duct means surrounding said inner main duct means and having an inlet on the surface of said fuselage for the boundary layer of air surrounding the same, jet engine means located in each of said main duct means and including compressor rotor means having a first set of inner radial blades located in said inner main duct means, and a second set of outer blades located in said outer bypass duct means, and a ring between said inner and outer blades for separating said inner main duct means from said outer bypass duct means; and mixing chamber means located in said fuselage between said annular bypass duct means of said two units and connecting said bypass duct means upstream of said outer blades so that air of the boundary layer entering through said inlets of the respective bypass duct means of said two units and having different air speeds is mixed before flowing to said outer blades.

4. In an aircraft, in combination, a fuselage having a tail portion; two jet propulsion units mounted in said tail portion, each jet propulsion unit including an inner main duct means having an inlet for air spaced from the surface of said fuselage and located close to, but outside of the boundary layer of air on the same, and annular bypass duct means surrounding said inner main duct means and having an inlet on the surface of said fuselage for the boundary layer of air surrounding the same, jet engine means located in each of said main duct means and including compressor rotor means having a first set of inner radial blades located in said inner main duct means, and a second set of outer blades located in said outer bypass duct means, and a ring between said inner and outer blades for separating said inner main duct means from said outer bypass duct means, said outer and inner blades having different angular positions, respectively to produce different air speeds in said inner and outer duct means; and mixing chamber means located in said fuselage between said annular bypass duct means of said two units and connecting said bypass duct means upstream of said outer blades so that air of the boundary layer entering through said inlets of the respective bypass duct means of said two units and having different air speeds is mixed before flowing to said outer blades.

5. In an aircraft, in combination, a fuselage having a tail portion; two jet propulsion units mounted in said tail portion, each jet propulsion unit including an inner main duct means having an inlet for air spaced from the surface of said fuselage and located close to, but outside of the boundary layer of air on the same, and annular bypass duct means surrounding said inner main duct means and having an inlet on the surface of said fuselage for the boundary layer of sair surrounding the same, jet engine means located in each of said main duct means and including compressor rotor means having a first set of inner radial blades located in said inner main duct means, and a second set of outer blades located in said outer bypass duct means, and a ring between said inner and outer blades for separating said inner main duct means from said outer bypass duct means, said outer and inner blades having different angular positions, respectively, to produce different air speeds in said inner and outer duct means; mixing chamber means located in said fuselage between said annular bypass duct means of said two units and connecting said bypass duct means upstream of said outer blades so that air of the boundary layer entering through said inlets of the respective bypass duct means of said two units and having different air speeds is mixed before flowing to said outer blades; and afterburner means at least in one of said duct means of each of said jet engine means.

References Cited by the Examiner

UNITED STATES PATENTS

| | | | |
|---|---|---|---|
| 2,503,006 | 4/1950 | Stalker | 60—35.6 |
| 2,509,890 | 5/1950 | Stalker | 244—15 |
| 2,516,671 | 7/1950 | Blowers et al. | 244—54 |
| 2,714,999 | 8/1955 | Thiebolt et al. | 60—35.6 |
| 2,747,364 | 5/1956 | Magin | 60—35.6 |
| 2,751,168 | 6/1956 | Stalker | 60—35.6 |
| 2,753,685 | 7/1956 | Mattinson | 60—35.6 |
| 2,971,724 | 2/1961 | Von Zborowski | 244—15 X |
| 3,060,685 | 10/1962 | Tonnies et al. | 60—35.6 |

FOREIGN PATENTS

| | | |
|---|---|---|
| 866,145 | 2/1953 | Germany. |
| 244,980 | 6/1947 | Switzerland. |
| 243,957 | 2/1947 | Switzerland. |

MILTON BUCHLER, *Primary Examiner.*

SAMUEL LEVINE, FERGUS S. MIDDLETON, *Examiners.*

C. R. CROYLE, L. C. HALL, *Assistant Examiners.*